Patented Nov. 23, 1926.

1,607,624

UNITED STATES PATENT OFFICE.

EDWARD F. HIGGINS, OF BROOKLYN, NEW YORK, ASSIGNOR TO JOS. H. MEYER BROS. INC., OF BROOKLYN, NEW YORK, A CORPORATION OF NEW YORK.

IMITATION MOTHER-OF-PEARL.

No Drawing. Application filed March 8, 1924. Serial No. 697,715.

This invention relates to a composition in imitation of mother-of-pearl.

The object of the invention is to provide a composition of matter or substance having the characteristic diffused sheen effects of genuine mother-of-pearl, and which is capable of being used in the manufacture of various articles of commerce.

In my pending application Serial No. 672,470, filed November 3, 1923, I have illustrated and described an apparatus and process of manufacturing imitation mother-of-pearl, wherein a pigment is incorporated into and distributed throughout a mass of plastic material, and such mass is then so manipulated as to cause the incorporated particles of pigment to become laid or disposed throughout the mass in a particular manner to give a directional trend thereto, which mass is then ready for the market or to be reduced to suitable form for use in the fabrication of various commercial products.

The present invention relates more particularly to the product of said process; that is, to a composition of matter in which at least some of the particles of pigment material contained in the plastic mass are disposed in unidirectional trend.

Various attempts have heretofore been made to produce a diffused sheen effect in pyroxyline and other plastic compounds in simulation of mother-of-pearl, and the use of various pigments has been proposed for such purpose. These efforts have been directed along two principal lines. According to one line the pigment employed is incorporated in the plastic mass by kneading or otherwise, either in a mixing machine or otherwise. The mass with the pigment so incorporated therein is then formed into a solid block under heat and pressure, which block, after cooling, is severed into thin sheets of the desired thickness. This method, while producing a homogeneous and easily workable, more or less flexible, material, nevertheless has not given satisfactory results for the reason that it yields a product having a more or less dulled or inferior luster. This is due to the fact that the particles of pigment are indiscriminately positioned throughout the mass of the plastic material without regard to the luster effects to be produced.

According to another proposed method the plastic mass is kneaded in a mixing machine, or by roller compression, or otherwise, without incorporating the pigment into the mass. The mass is then formed into a block or cake by compression and heat, and the block or cake, so formed, is then slit into thin sheets. One or both of the surfaces of the individual sheets is rubbed over with a pigment suspended in a liquid, or else the pigment is applied to the surface (one or both) of the sheet by flowing the same thereover in the form of a thin film, or otherwise. The thin sheets so treated are then stacked up in a pile which is subjected to heat and pressure to form the same into a block or cake. This block or cake is then severed into sheets of the desired thickness, and these sheets are employed in the manufacture of various articles of commerce. While this operation yields a product which is superior in luster to that of the other line of operation above mentioned, nevertheless the product is hard, brittle and flaky and cracks or breaks even with slight bending, the breaks occurring along the lines which mark the joint between adjacent sheets when stacked or piled up after having the pigment applied to the surface thereof. This result is due to the fact that the particles of pigment, or the film applied to the surface or surfaces of the sheets, which film contains the particles of pigment, have not been thoroughly incorporated into the body of the mass, but remain and act as insulating layers between the surfaces of adjacent sheets, thereby preventing homogeneous uniting of the surfaces of such adjacent sheets. This product, by reason of its brittleness and friability, is difficult to work up into finished products, and, moreover, the products made therefrom are easily injured by parts breaking or scaling off.

I propose, in accordance with my present invention, to provide a product which avoids the objections noted and which possesses the desired sheen effect or luster and is not hard, brittle or flaky, and which, therefore, can be easily worked up into various commercial articles.

In accordance with my present invention, I propose to thoroughly incorporate the pigment into and distribute the same throughout the plastic mass while such mass is maintained in a softened condition by the action of an excess of solvent therein, or otherwise, and then, after removal of the excess solvent, I propose, in accordance with one method of making my product, to subject the mass to a cooking action under heat and pressure to reduce the same to a desired state of plasticity or fluidity, and then to force the plastic or more or less fluid mass through a hot die in order to exert an ironing, polishing or calendering action upon the surfaces of the mass extruded through the die and while the mass is still in softened condition. This action causes the particles of pigment material to become disposed in more or less the proper and uniform direction or trend of direction to produce the best and highest degree of lustrous effect in the ultimate product. The polished sheets thus produced are then stacked into a pile without any intervening insulating layer of pigment or film. This stack or pile is then subjected to heat and pressure to form the same into a solid block or cake in which the individual sheets become homogeneously united and amalgamated. The resulting homogeneous block or cake is then severed into sheets for use in the manufacture of various commercial articles, in which the luster effects, in remarkably close resemblance to genuine mother-of-pearl, are secured, and which is not brittle or friable or flaky, and which can be readily and easily worked up into commercial articles.

In carrying out my invention, I first produce the celluloid or other desired plastic composition in the usual, ordinary and well known way. The mass is thoroughly kneaded into a dough with an excess of solvent, care being taken to filter off all dirt or other extraneous matter. Into this plastic mass is then thoroughly incorporated the desired pigment. I have found a fish scale pigment suspension in a solvent which is miscible with the plastic mass material, such, for example, as alcohol, acetone, or the like, suitable for my purposes. After adding the pigment in the manner described, the plastic mass is thoroughly kneaded in a mixing machine or otherwise to thoroughly incorporate the pigment in, and uniformly distribute the same throughout the mass. Any excess of solvent contained in the mass is then removed in any suitable manner. This may be conveniently accomplished by kneading the mass on warm rolls, or by working the same back and forth in a kneading apparatus of common construction, to permit the solvent to sufficiently evaporate. After the removal of the excess of solvent to the desired degree, the mass is then subjected to heat and pressure until it is cooked and reduced to a condition of more or less fluidity or flowing plasticity. This plastic or fluid mass is then extruded while under heat and an increased pressure through a hot die having a slot or opening of restricted area. From this die the material is delivered in the form of a thin body or sheet, according to the construction of the die, the surface of which body or sheet is ironed, polished or calendered during the extruding operation. This causes the facets or surfaces of the pigment particles which have been previously incorporated into the mass, or some of them, to become disposed in a more or less uniform direction or trend of direction in the extruded product. These sheets or thin bodies are then stacked or piled up and the stack or pile is subjected to heat and pressure in order to form the same into a solid block or cake in which the individual sheets become amalgamated into each other at their contacting surfaces to form a solid block or cake which is homogeneous throughout. This homogeneous block is then severed into sheets of the desired thickness for use in the manufacture of various articles of commerce.

By reason of the ironing or calendering action resulting from the extruding operation, the facets or faces of the pigment particles are given a directional trend which enables me in my final product to secure a very superior and beautiful lustrous effect which is impossible of attainment by the methods and operations heretofore proposed or employed. Moreover, by thoroughly incorporating the pigment material within and distributing the same throughout the mass, I am enabled to increase the amount of pigment employed to any desired degree of density necessary to attain any desired lustrous effect. Where the pigment is not incorporated within the plastic mass but is merely applied to or flowed over the surface of thin sheets obtained from the plastic mass, any increase in the amount of pigment employed results in increasing the brittleness and friability of the resulting material, when sheeted, and its liability to flake, because of the resulting increase in the insulation between the sheets of plastic material which an increased quantity of pigment will cause, thereby preventing the amalgamation of the surfaces of the sheets into a homogeneous union when they are pressed into a block or cake.

If desired, and in order to secure a desirable variation in the lustrous sheen effects obtained in the final product, I may employ as one or more layers in the stack or pile of thin sheets produced by the ironing or calendering operation, small sections or pieces into which one or more of such sheets may be divided, these small sections or pieces being indiscriminately disposed to form the layer or layers in the stack or pile. After the stack or pile so built up and composed is formed by heat and pressure into a homogeneous block or cake which is severed or sliced into thin sheets, such sheets will contain a variegation of lustrous sheen effects which, for some purposes, is desirable in products made therefrom.

I do not show or describe herein any apparatus employed to effect the disposition of the pigment particles in a directional trend, as my present invention relates only to the product and not to the apparatus nor to the process employed in its production. I may say, however, that the extruding apparatus shown, described and claimed in my application Serial No. 672,470, is well suited for the purpose.

Having now set forth the objects and nature of my invention, what I claim as new and useful, and of my own invention, and desire to secure by Letters Patent, is:

1. As an article of manufacture, a homogeneous plastic composition having pigment particles incorporated in and uniformly distributed throughout the mass thereof, said pigment particles having light reflecting faces or facets, said faces or facets disposed in substantially the same directional trend therein.

2. As an article of manufacture, a homogeneous plastic composition having pigment particles incorporated in and uniformly distributed throughout the mass thereof, said pigment particles having light reflecting faces or facets, said faces or facets being disposed in a uniform directional trend.

3. As an article of manufacture, a plastic composition having pigment particles with light reflecting faces or facets incorporated in and uniformly distributed throughout the mass thereof, the faces or facets of the pigment particles presenting themselves in substantially the same direction.

4. As an article of manufacture, a homogeneous plastic composition having a pigment containing particles with light reflecting faces or facets incorporated in and uniformly distributed throughout the mass thereof, the faces or facets of the pigment particles being disposed in substantially the same direction.

5. As an article of manufacture, a flexible homogeneous plastic composition having pigment particles with light reflecting faces or facets incorporated in and uniformly distributed throughout the mass thereof, the faces or facets of at least a portion of said pigment particles being disposed in substantially uniform direction.

6. As a new article of manufacture, a homogenerous flexible plastic body having pigment particles with light reflecting faces or facets incorporated in and distributed throughout the mass thereof, said faces or facets lying in substantially the same direction.

In testimony whereof I have hereunto set my hand on this 3rd day of March, A. D., 1924.

EDWARD F. HIGGINS.